R. MORRIS.
CARPET-BEATER.

No. 176,191. Patented April 18, 1876.

Witnesses:
N. H. Sherburne.
W. D. Shipman

Inventor:
Royal Morris
By Gridley & Sherburne
Attys.

UNITED STATES PATENT OFFICE.

ROYAL MORRIS, OF CHICAGO, ILLINOIS.

IMPROVEMENT IN CARPET-BEATERS.

Specification forming part of Letters Patent No. 176,191, dated April 18, 1876; application filed March 29, 1876.

*To all whom it may concern:*

Be it known that I, ROYAL MORRIS, of Chicago, in the county of Cook and State of Illinois, have invented a new and useful Improvement in Carpet-Beaters; and I do hereby declare the following to be a full, clear, and exact description thereof, which will enable others skilled in the art to which my invention appertains to make and use the same, reference being had to the accompanying drawing, forming part of this specification, in which—

Figure 1:
Figure 2:
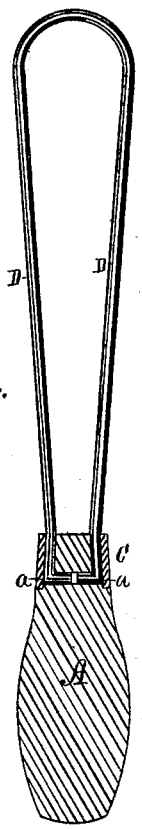

Figure 1 represents an isometrical view of a carpet-beater embodying my invention; and Fig. 2 a like view, cutting the handle through the center, showing the manner of securing the beater therein.

Like letters of reference indicate like parts.

The object of my invention is to provide a durable, cheap, and convenient hand-tool for beating carpets; and consists in the novel manner of securing the beaters to the handle, as hereinafter more fully described.

In the drawing, A represents the handle, which is made of any suitable material and of the proper size to admit of being conveniently grasped within the hand. C is a metal ferrule, fitted upon the end of the handle in the usual manner. D D are the beaters, which are made of a single piece of wire, bent at its center in the form shown, and at its ends to a right angle to its plane, forming pivots *a a*, adapted to enter an aperture formed transversely through the handle at a point near its end. That portion of the handle coming in contact with the beaters laterally is grooved or cut away so as to admit the beaters between the handle and the ferrule, as shown in Fig. 2, by which means the pivots are held firmly within the aperture, and thereby connecting the beaters to the handle.

The beaters are made, preferably, of steel or brass wire of any desired size, but unannealed iron wire may be used.

Having thus described my invention, what I claim as new, and desire to secure by Letters Patent, is—

The hand carpet-beater, consisting of the handle A, ferrule C, and beaters D D, the beaters made of a single piece of wire bent at its ends to form the pivots *a a*, adapted to enter the aperture in the handle, and secured therein by the ferrule, substantially as specified.

The above specification of my invention signed by me this 21st day of March, 1876.

ROYAL MORRIS.

Witnesses:
N. C. GRIDLEY,
N. H. SHERBURNE.